US006579177B2

(12) United States Patent
Mraovic (10) Patent No.: US 6,579,177 B2
(45) Date of Patent: *Jun. 17, 2003

(54) COMPUTER GAME AND PROCEDURE OF ALIGNING OBJECTS IN A FIELD AND APPLICATIONS OF THE PROCEDURE

(76) Inventor: Dusan Mraovic, 5000 "K" Ave., Apt. 2923, Plano, TX (US) 75074

( * ) Notice: Subject to any disclaimer, the term of this patent is extended or adjusted under 35 U.S.C. 154(b) by 0 days.

This patent is subject to a terminal disclaimer.

(21) Appl. No.: 10/046,628

(22) Filed: Jan. 14, 2002

(65) Prior Publication Data

US 2002/0058541 A1 May 16, 2002

Related U.S. Application Data (63) Continuation of application No. 09/440,146, filed on Nov. 15, 1999, now Pat. No. 6,352,475, which is a continuation of application No. PCT/IB98/00659, filed on Apr. 30, 1998.

(51) Int. Cl.[7] .................................................. A63F 13/00
(52) U.S. Cl. .......................................................... 463/9
(58) Field of Search ................. 463/9, 10; 273/153 S, 273/153 P (56) References Cited

U.S. PATENT DOCUMENTS

| 4,415,153 A | 11/1983 | Yokoi ..................... 273/1 GC |
| 4,905,147 A | 2/1990 | Logg ......................... 364/410 |
| 4,922,420 A | 5/1990 | Nakagawa et al. ......... 364/410 |
| 5,265,888 A | 11/1993 | Yamamoto et al. ......... 273/434 |
| 5,312,113 A | 5/1994 | Ta-Hsien et al. ............ 273/434 |
| 5,423,556 A | 6/1995 | Latypov .................... 273/434 |
| 5,456,607 A | 10/1995 | Antoniak ................... 434/323 |
| 5,465,982 A | 11/1995 | Rebane ...................... 273/433 |
| 6,093,104 A | 7/2000 | Kasahara et al. ............ 463/30 |
| 6,129,633 A | 10/2000 | Lee ............................. 463/31 |

FOREIGN PATENT DOCUMENTS

DE          195 27 860          2/1996

OTHER PUBLICATIONS

International Search Report based on PCT/IB98/00659, filed Apr. 30, 1998.
Pentaminos –1995.
Tetris DX Instruction Booklet –1987.
Coldwell, "Problem–based learning and computer games in design education", *Computer Educational* Feb. 1996, Comput. Educ. Group Staffordshire Univ, UK, No. 82, pp. 2–5.

*Primary Examiner*—Michael O'Neill
(74) *Attorney, Agent, or Firm*—Connolly Bove Lodge & Hutz LLP (57) ABSTRACT

A computer game includes a procedure of aligning objects in a field. The procedure includes a series of sub-procedures each including creating and positioning a new object within the field and moving the new object within the field. Moving the objects occurs regardless if the object is moved above one or more other objects. It is detected if the object is situated above one or more other objects and if a complete column and/or row within the field is filled with one or more parts of the objects. If no object is positioned above any other object and a complete row and/or column is filled with the objects or parts of the objects, the objects or the parts of the objects which are positioned within that column and/or within that row are removed from the field. The computer game is applicable for storing objects in a storage-device, as an adult-check, identity-check or as an intelligence trainer.

14 Claims, 6 Drawing Sheets

COMPUTER GAME AND PROCEDURE OF ALIGNING OBJECTS IN A FIELD AND APPLICATIONS OF THE PROCEDURE

This application claims priority to PCT/IB98/00659 filed Apr. 30, 1998 and is a continuation of U.S. application Ser. No. 09/440,146 filed Nov. 15, 1999 now U.S. Pat. No. 6,352,475 which is a continuation of PCT/IB98/00659 filed Apr. 30, 1998.

BACKGROUND OF THE INVENTION

1. Field of the Invention

The invention relates to computer games, especially computer games with procedures of aligning objects in a field and to applications of that procedure. That procedure comprises a series of sub-procedures each consisting of (randomly) creating and positioning a new object within the field and moving the new object within the field. In many fields of technology it is interesting to use procedures of aligning objects which work as efficiently as possible. The dimension and the size of these objects may vary. The invention is applicable to two-dimensional objects as well as three-dimensional objects. The size of the objects may vary between an area of a few square millimeters ($mm^2$) and bodies having a volume of a few cubic millimeters ($mm^3$) or several cubic meters ($m^3$).

2. Description of the Related Art

Computer games, which allow manipulations of objects, are widespread. It is known that an efficient packaging of objects may be obtained by placing them as densely as possible. This means that different objects are in contact with each other. The methods of positioning and removing objects vary widely depending on the scale of objects, the size of the two- or three-dimensional field and on mechanisms suitable for positioning and removing objects.

SUMMARY OF THE INVENTION

The invention relates to positioning and storing or removing objects in a computer game as efficiently as possible.

An aspect of the invention involves a computer game with a procedure of aligning objects in a field. The procedure includes a series of sub-procedures. A new object is created, positioned, and moved within the field. The moving of the object occurs without directional constraint regardless of whether the object is overlapping with one or more other objects. The procedure detects whether the object is overlapping with one or more other objects, and whether at least one column or at least one row within the field is filled with one or more parts of the objects. Objects or parts of the objects within a filled column and/or filled row are removed from the field if no object us overlapping with any other object and at least one complete row or column is filled with said objects or parts of said objects.

Another aspect of the invention involves a method of providing a player with an interactive computer game having a procedure of aligning objects in a field. A new object is created, positioned, and moved within the field. The moving of the object occurs without directional constraint and regardless of whether the object is overlapping with one or more other objects. The procedure detects whether the object is overlapping with one or more other objects, and whether at least one column or at least one row within the field is completely filled with one or more parts of said objects. The procedure removes the objects or parts of the object within a filled column and/or filled row from the field if no object is overlapping with any other object and at least one complete row or column is filled with objects or parts of said objects.

A further aspect of the invention involves a computer game for use in at least one of the following: identifying persons, training intelligence of a person and determining if a player is a minor. The game includes a procedure of aligning objects in a field and the procedure has a series of sub-procedures. A new object is created, positioned, and moved within the field. The moving of the object occurs without directional constraint and regardless if the object is overlapping with one or more other objects. The procedure detects whether the object is overlapping with one or more other objects, and whether at least one column or at least one row within the field is completely filled with the objects or one or more parts of the objects. The procedure removes the objects or parts of the objects within a filled column and/or filled row from the field if no object is overlapping with any other object and at least one complete row or column is filled with the objects or parts of said objects.

Another aspect of the invention involves a computer system having a memory, at least one input device and at least one visual output device. At least one data processor is configured for data communication with the input device, the visual output device and the memory. A program executed by the data processor, receives commands via the input device and displays graphical information on the visual output device. The program places objects in a field based on the commands, and selectively removes objects or portions of objects from the field if no object is overlapping with any other object and when a row or a column of the field is filled with the objects or part of the objects. The displayed graphical information includes the field and the objects.

The dimension or the size of the objects is not limited in any way. The nature of the object is also not limited in any way. The invention is applicable to physical objects and to virtual objects.

An embodiment of the invention with physical objects may be used as a storage system. The physical objects may be as big as the size of containers, and the virtual objects may symbolize special areas of a display or an information-storing device. It is contemplated that the invention is applicable for any type of storage systems.

The positioning of a new object may be performed randomly, directed by an algorithm as it is, for example, performed by a computer program or by manually electing a movement or a type of movement or a non-movement.

An advantageous application of the invention includes a manually controlled movement or non-movement of the objects to determine the maturity of a user. The positioning of the objects within the field requires a certain level of recognition, intelligence and reactivity. These abilities need experience and training. Therefore, only persons who have achieved a certain level may master the positioning in a successful way.

Therefore, the invention may be used to evaluate these abilities and to determine if the user is an adult. In some applications it is desired to determine whether a person, especially a person requiring access to a computer or to a restricted area of a computer network, has reached a certain maturity. It is known to protect Internet-pages that have a content which is not suitable for minors are protected by an "adult-check." Such an adult-check consists normally of a field in which the person who asks for permission to access the Internet page has to input the number of the user's credit card or driver's license. Such an approach is intended to determine whether the person has achieved a minimum age, especially an age for being regarded as an adult. This adult-check is problematic because a person other than the true owner of the credit card may use the number to get access.

An embodiment of the invention may be used as an effective and reliable adult-check to prevent misuse of the credit card, for example, by a minor.

The invention not only allows determining the user's visual abilities, intelligence and ability to react, but may also be used as a trainer for these qualities, especially as an intelligence-trainer.

To use the procedure as an intelligence-trainer it is especially advantageous when each object has the shape of five joined squares. Surprisingly, an implementation of the invention with objects formed by five joined squares is capable of increasing a person's recognition, intelligence and ability to react. A possible explanation for this phenomenon is that objects from five joined squares, which are called PENTAMINOS, tend to maximize challenges associated with recognition and intelligence.

BRIEF DESCRIPTION OF THE DRAWINGS

Improvements, implementations and advantages of the invention will become apparent upon reading the following detailed description of preferred embodiments of the invention and upon reference to the accompanying drawings.

DETAILED DESCRIPTION OF THE PREFERRED EMBODIMENTS

Figure 1:
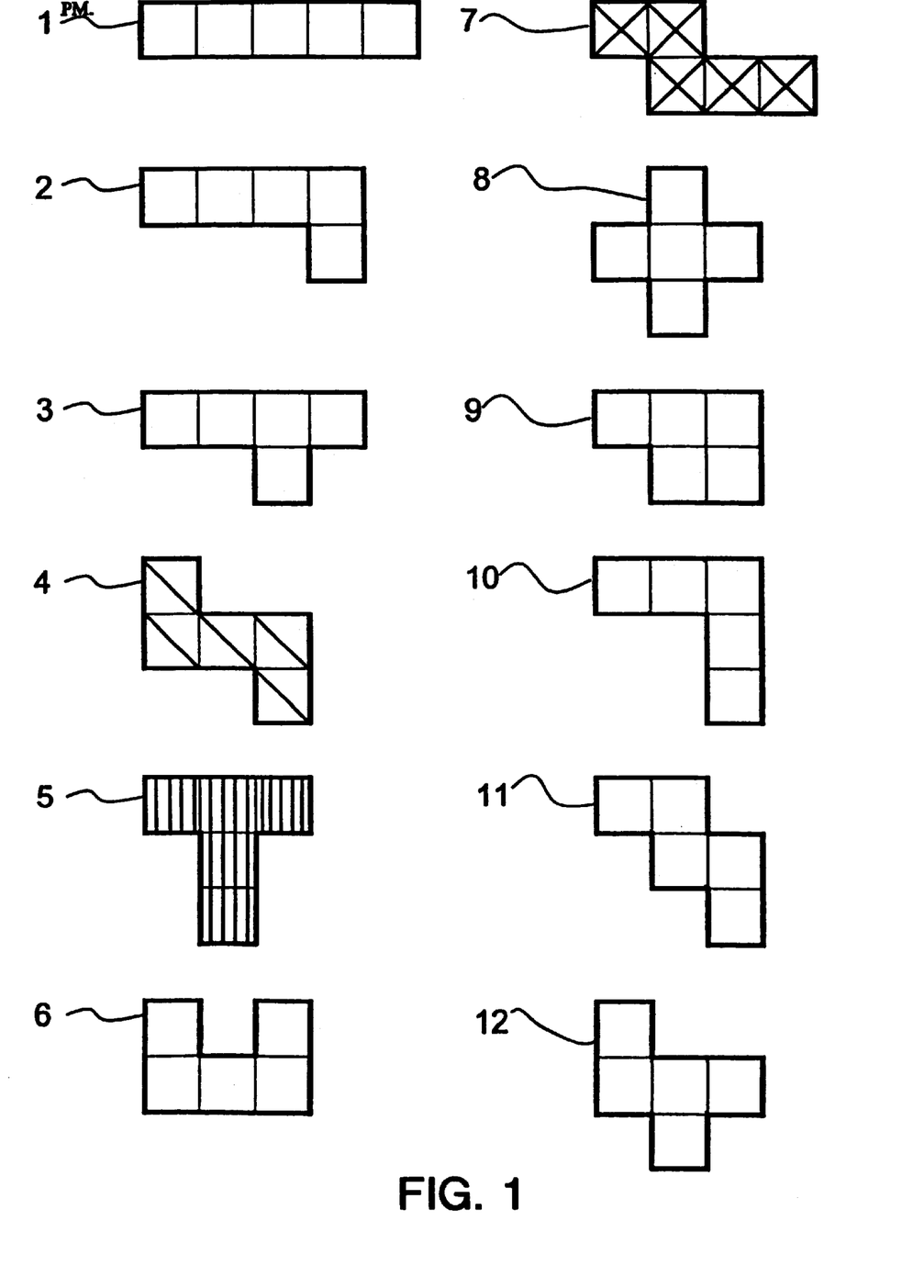
FIG. 1 shows twelve possible types of PENTAMINO-shaped two-dimensional objects formed by joining at least one side of each square with at least one other side of another square.
Figure 2:
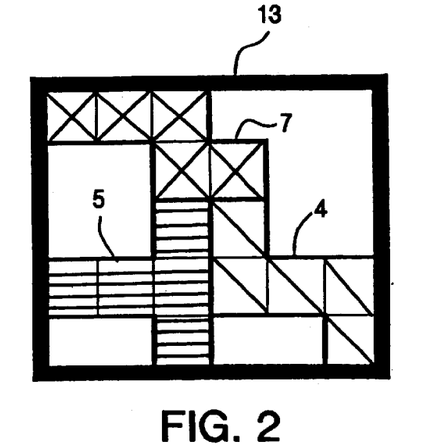
FIG. 2 shows a field including three PENTAMINOS.
Figure 3:
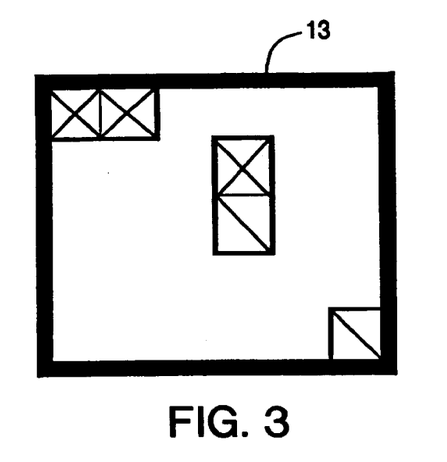
FIG. 3 shows the field of FIG. 2 after removing one column and one row.
Figure 4:
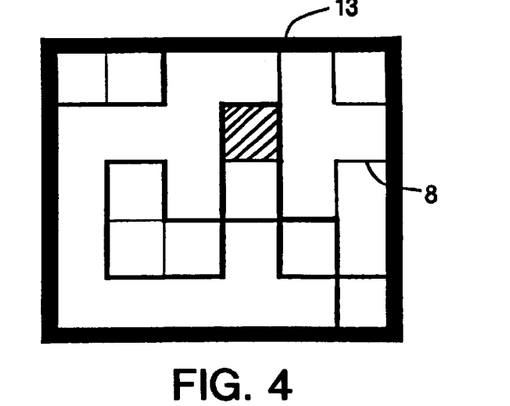
FIG. 4 shows a field which is filled with objects in a way which makes the positioning of a particular object impossible and which demonstrates a final step of the procedure.

As shown in FIG. 1, twelve different shapes of PENTAMINO may be created, each formed by five equally sized squares. These PENTAMINO-shaped objects 1, 2, 3, 4, 5, 6, 7, 8, 9, 10, 11 and 12 are suitable for a placing in a field with a suitable number of squares. FIGS. 2–4 illustrate an exemplary procedure of aligning objects in a field 13. The field 13 may be a playing field of a computer game.

In one embodiment, the field 13 is rectangular and capable of receiving the objects 1–12 according to FIG. 1, as shown in FIG. 2. The field 13 comprises, in one embodiment, an area of thirty squares and is therefore capable of receiving any of the twelve PENTAMINO-shaped objects 1–12. One of the objects 1–12 is placed within the field 13. A second object is initially partly positioned above the first object (not shown).

Figure 8A:
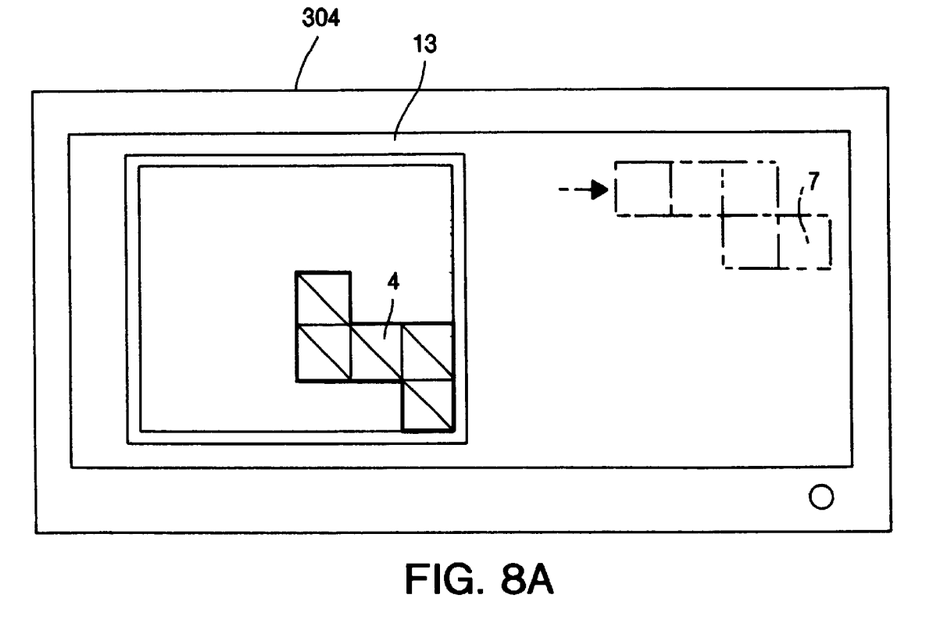
FIGS. 8A and 8B show an object being discarded before the positioning of an object within a field.
Figure 8B:
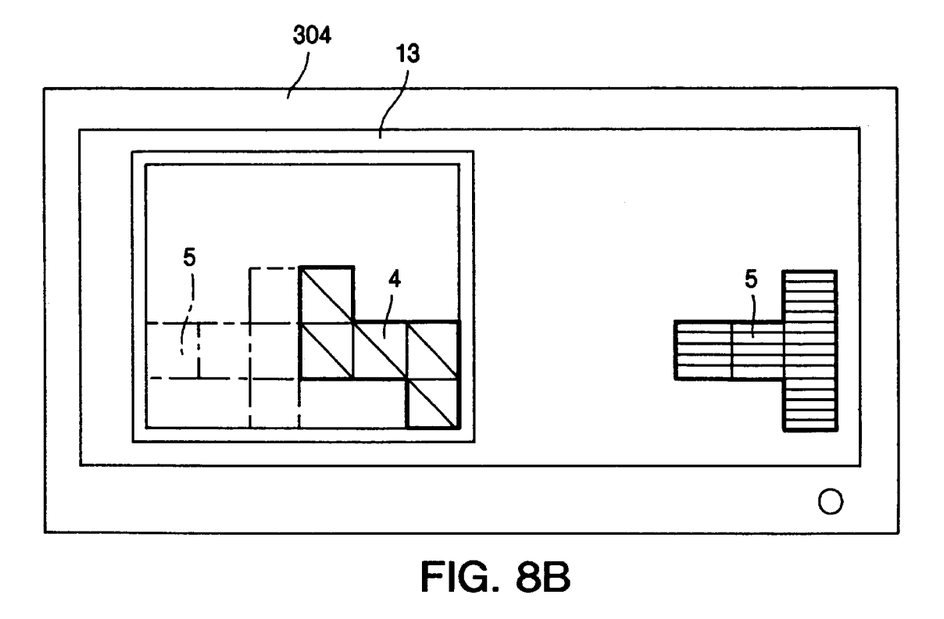

Each object 1–12 can be rotated, mirrored or moved to any place within the field 13 and positioned therein. Afterwards, a third object may be rotated, mirrored or moved as the previous objects. In the illustrated embodiment, the field 13 is filled with objects 4, 7 and 5 as shown in FIG. 2. If a column and/or a row are completely filled with objects, parts of the objects are automatically removed. A situation gained by this removing of frill rows and columns is presented in FIG. 3. In FIG. 3, it is shown that the remaining objects in the filed do not shift once the row and column are removed (see FIGS. 2 and 3). It is also possible to discard an object prior to the object being put into the field (see FIGS. 8A and 8B). Another possible final configuration of the procedure is represented in FIG. 4. So many squares are occupied that another object, for example, the newly generated object 8, cannot be positioned in any empty space within the field 13. In this situation the only possible way to play more is to discard the object 8 and continue with one of other 11 objects.

Hereinafter, the procedure of aligning objects 1–12 in the field 13 is described in greater detail. In the illustrated embodiment, the field 13 has 5×6 squares and is created on a display like a liquid crystal display (LCD) or a screen of a computer monitor.

A first PENTAMINO-shaped object 1–12, which may have any of the shapes represented in FIG. 1, is created. A suitable random generator chooses one of the shapes represented in FIG. 1. Where a hardware implementation of the procedure can be obtained by an automatic positioning of objects, an application which tests or trains a person's abilities may be advantageously equipped with a mechanism for positioning the objects according to instructions from one or more persons. Afterwards the object is suitable positioned. In this case, the word "positioned" means that it is not possible to move the object any more.

A new object is generated after the first object is positioned and displayed on the screen as described above. The new object is movable within the field 13 without any limitation. For instance, it is possible to move the new object above the first object.

A computer may analyze if one object is in a position in which it is completely or partly located above one or more other objects. If one object is partly or totally located above one or more other objects no further object is generated. Only a final position of the objects, in which no object is located in any way above another object, is detected and evaluated as a successful configuration or event.

In the presence of a successful configuration, a full column and/or a full row of the field the squares of this column and/or row are removed. If more than one whole column and/or whole row are full, all squares from those columns and/or rows are removed. Hence, a new and empty area in the field 13 is created which can be used as a place in which newly created objects can be positioned.

The successful event—i.e. positioning was successful—is also a necessary condition, which has to be fulfilled before a new object is generated.

In a more advanced implementation of the procedure it is checked if such a successful event occurs within a certain, preferable predetermined time. If it was not possible to achieve the successful event the situation is evaluated and marked as a mistake.

Another potential final situation is presented in FIG. 4. FIG. 4 shows the situation in which so many squares are occupied that it is not possible to position the newly created object, for example, the object 8 shown on FIG. 1, in a manner in which it can be positioned without lying above another object.

It is a further advantage to display an object, which is intended for being created within the field, before it has been actually created. It is especially advantageous to combine the displaying of the element with the possibility to discard the object if an operator does not desire to use the element within the procedure.

Figure 5:
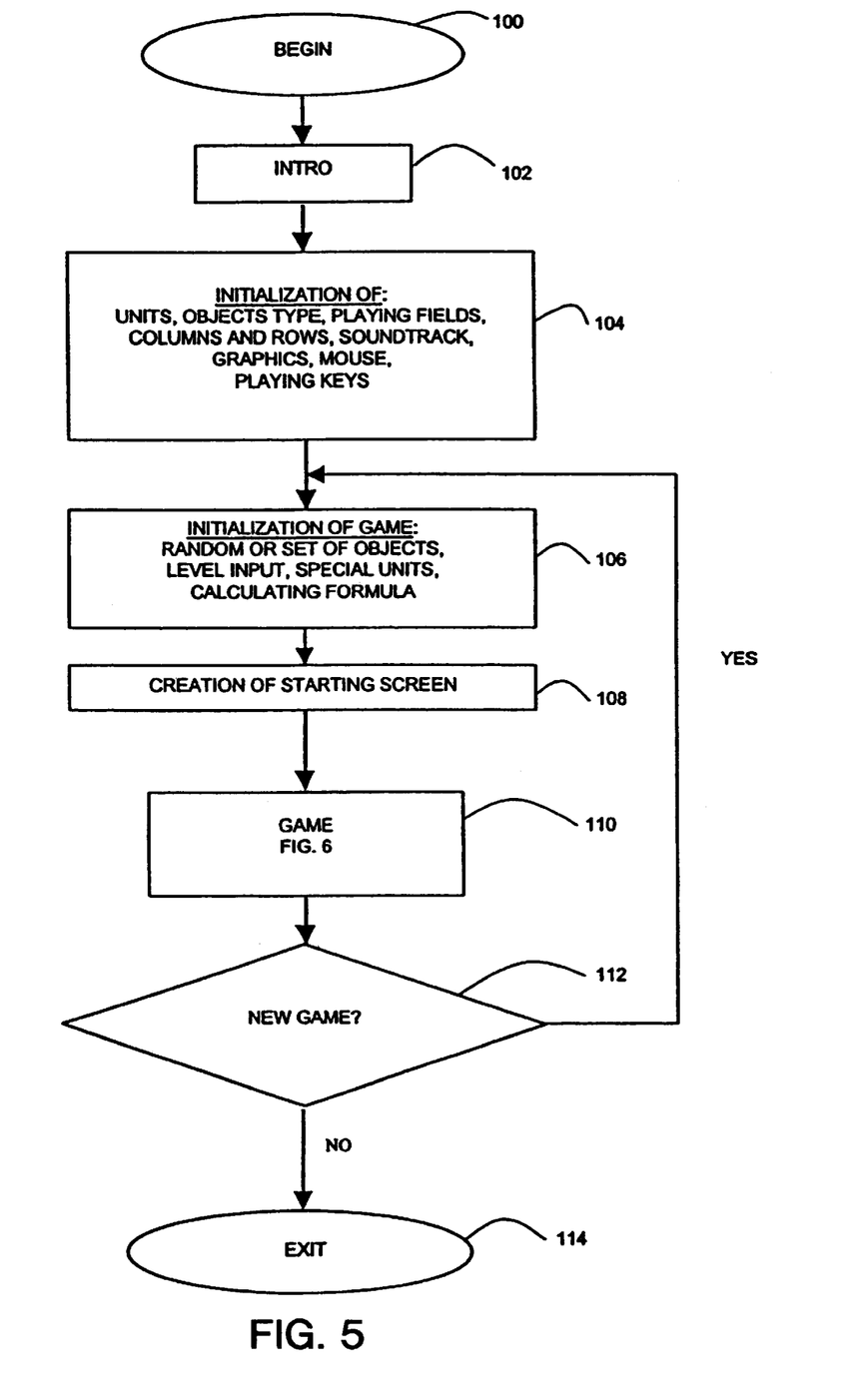
FIG. 5 shows a flow diagram of a procedure to place objects.
Figure 7:
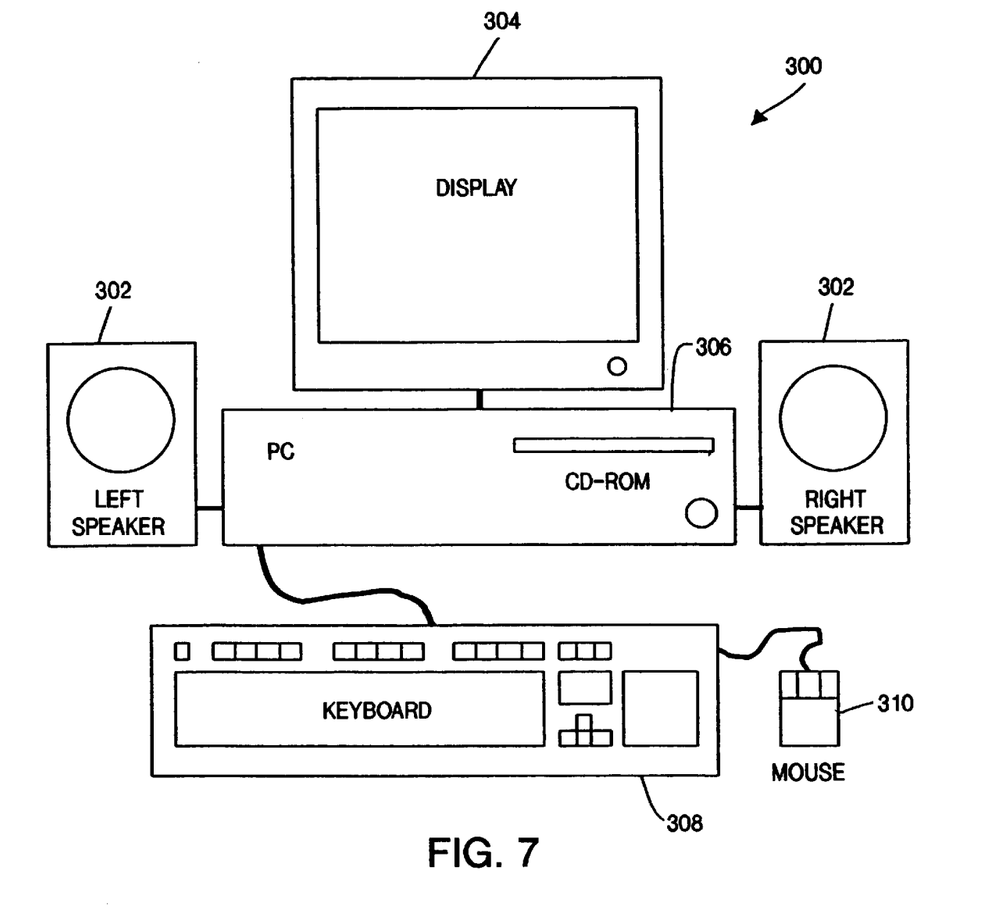
FIG. 7 shows an overview of a computer system to play computer games.

FIG. 5 shows a flow diagram of the procedure to align objects. It is contemplated that in one embodiment the procedure is executed by a computer system as shown in FIG. 7, and that a user/player controls the computer system. The procedure begins in step 100 in which the game starts to run in the computer system.

Proceeding to steps 102 and 104, the game introduces itself to the user by generating an illustration of the game and its features on the system's display. The game initializes units, a type of the objects, playing fields, columns and rows, a soundtrack, graphics, a computer mouse and playing keys.

Proceeding to step 106, the user has the option to initialize the game. For instance, the user may select if the game generates random objects or an ordered set of objects. In addition, the user may select a playing level (e.g., beginner or advanced) for the game, special units, and a calculation algorithm.

Proceeding to step 108, the procedure creates the screen for the game. For instance, the screen shows the playing field and parameters of the game. The parameters may include the playing level, the name of the present user, previous settings for this user, and the like.

Figure 6:
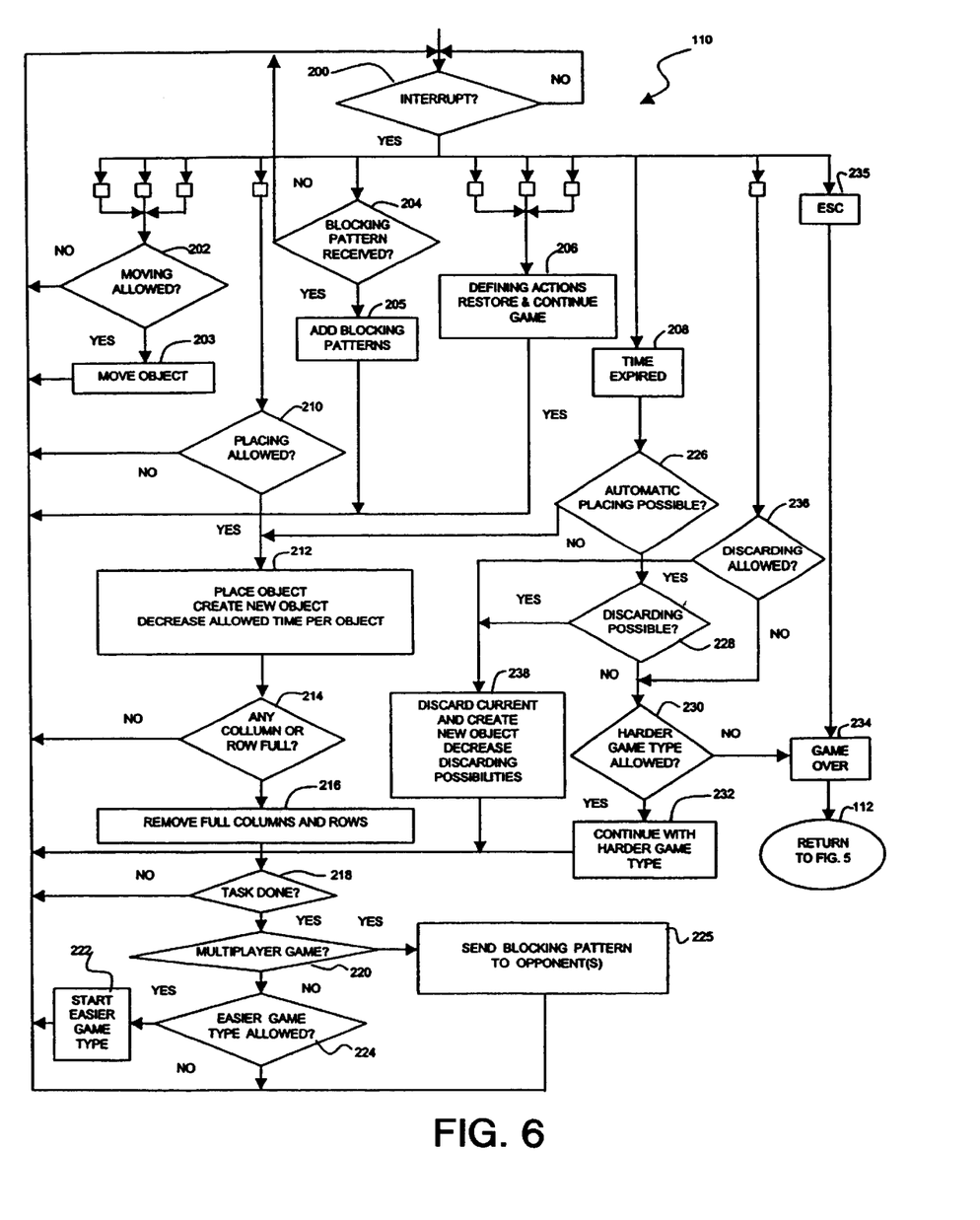
FIG. 6 shows a flow diagram of the "GAME" subroutine of the procedure shown in FIG. 5.

Proceeding to step 110, the user plays the game. The flow diagram of FIG. 6 illustrates the game in greater detail. The user may play the game until the playing rule determines that the game is over, or the user may interrupt the present game at any time and terminate the game.

Proceeding to step 112, when a game is over the procedure returns along the YES branch to step 106 if the user selects a new game. If the user does not want to play another game, the procedure proceeds along the NO branch to step 114 and the procedure ends.

FIG. 6 shows a flow chart of a procedure that defines the game as represented by step 110 shown in FIG. 5. Referring to step 200, the procedure determines if an interrupt occurred. If the user wants to continue with the game, the procedure executes the game in accordance with the settings of the initialization step 106 of FIG. 5.

Proceeding to step 202, the procedure determines if the playing rule allows moving objects within the playing field. If such moving of an object is allowed, the procedure proceeds along the YES branch, moves the object, and returns to step 200. If such moving is not allowed, the procedure returns along the NO branch of step 202 to step 200.

Proceeding to step 204, the procedure determines if a blocking pattern has been received. If such a blocking pattern is received, the procedure proceeds along the YES branch, adds the blocking pattern to the playing field, and returns to step 200. If a blocking pattern is not received, the procedure returns along the NO branch of step 204 to step 200.

Proceeding to step 206, the procedure defines various actions as restoring and continuing the game. The procedure returns then to step 200.

Proceeding to step 210, the procedure determines if the playing rules allow placing of an object. If such placing of an object is allowed, the procedure proceeds along the YES branch to step 212 places the object, creates a new object on the field, and decreases the time allowed per object. If such placing is not allowed, the procedure returns along the NO branch of step 210 to step 200.

Proceeding to step 214, after the object has been placed, the procedure determines if any column or row is full. If no column or row is full, the procedure returns along the NO branch to step 200. If a column or row is full, the procedure proceeds along the YES branch to step 216 and removes the full column or row.

Proceeding to step 218, the procedure determines if the task of step 216 has been done. If the task has been done, the procedure returns along the NO branch to step 200. If the task has not been done, the procedure proceeds along the YES branch to step 220.

In step 220, the procedure determines if more than one player plays the present game. If the game is a multiplayer game, the procedure proceeds along the YES branch to step 225, sends a blocking pattern to the at least one opponent, step 225, and returns to the step 200. However, if only one player plays the game, the procedure proceeds along the NO branch to step 224.

In step 224, the procedure determines if an easier type of game is allowed. If this is allowed, the procedure proceeds along the YES branch, starts an easier level of game, and returns to step 200. If an easier type is not allowed, the procedure proceeds along the NO branch and returns to step 200.

The playing rules of the game allow a player only a certain time to act. In step 208, the time already expired, and the procedure proceeds to step 226. In step 226, the procedure determines if an object can be placed automatically, i.e., placed and moved to a place which is determined or evaluated by the computer. If this is allowed, the procedure proceeds along the YES branch to step 212 and continuous along the steps following step 212 as described above. If an object cannot be placed automatically, the procedure proceeds along the NO branch to step 228.

In step 228, the procedure determines if an object can be discarded i.e., if it can be removed. If this is allowed, the procedure proceeds along the YES branch to step 238, discards the current object, creates a new object, and decreases the possibilities for discarding objects. The procedure returns then to step 200. If an object cannot be discarded, the procedure proceeds along the NO branch to step 230.

In step 230, the procedure determines if a more difficult ("harder") type of game is allowed. If this is allowed, the procedure proceeds along the YES branch to step 232, starts a "harder" level of game, and returns to step 200. If a "harder" type is not allowed the procedure proceeds along the NO branch to step 234 and the game is over. The procedure continues then in step 112 of FIG. 6.

Discarding of objects may be allowed regardless if the time expired (step 208) or automatic placing is not possible (step 226), as illustrated in step 236. In step 236, the procedure determines if it is allowed to discard an object. If this is allowed, the procedure proceeds along the YES branch to step 238, discards the current object, creates a new object, and decreases the possibilities for discarding objects. The procedure returns then to step 200. If an object cannot be discarded, the procedure proceeds along the NO branch to step 230 as described above.

It is contemplated that the player can cancel the game at any time, as illustrated in step 235. If the player cancels the game, the procedure proceeds to step 234 and the game is over.

The procedure of the game as illustrated in FIGS. 5 and 6 is further explained with references to various embodiments according to the invention as set forth hereinafter.

The number of games that arise from a basic rule of erasing columns and/or rows is vast. All variants described below could be combined with each other resulting in hundreds of possible game variants. Combinations of these variants come from combinations of playing sets and playing rules.

Because of the structure of the present computer entertainment market, games are issued in several stages, every time the games allow different possibilities, for example, starting with a predefined playing set and ending with a user-defined playing set. The playing set consists of objects, clusters, playing fields, playing areas and "columns and rows", which are either predefined in full or in part or user-defined in part or in full.

A unit is the smallest object of the game. In the case of two-dimensional playing fields, it is an advantage to use triangles, tetragons or hexagons as units because they can be grouped in playing fields that contain no unreachable sub-areas. It is also possible to use other kinds of units (i.e., circles, ellipses, pentagons and other polygons or other geometrical and non-geometrical images, different kinds of units of any shape). The types of the unit and the image can be predefined or user-defined (optional). During the game a status of units can be altered (optional) or switched.

Additionally, within the playing field a special unit (one or group) can be defined (optional). Special units can influence the game flow and other units in a predefined or user-defined way. For example, the special units can grow, remove surrounding units, forbid influence of created objects, i.e., to be accessed (unsociable), be overlapped (unreachable) or be removed (nonremovable).

If they grow, they can influence other units in different ways. Growth can be combined with sociability (optional). For example, unsociable units can throw created objects in another playing field or have predatory behavior, and sociable units can be too social (i.e., tie other units and created objects). For example, unsociable (or too much sociable), reachable and/or unreachable units can be defined as alterable, removable and/or nonremovable.

Although forbidding a removal is especially interesting in multiplayer games, when opponents can send to each other removable or nonremovable units, it can be used in single player games as well.

In the case of a three-dimensional game, the two-dimensional rule is used, but instead of two-dimensional objects, three-dimensional objects like balls, tetrahedrons, cubes or any other geometrical or non-geometrical body can be used. It is advantageous to use objects that can be joined with or without unreachable subspaces inside a playing field.

A created object comprises one or more units, grouped according to predefined or user-defined rules. Creation and appearance of a created object can be predefined, user-defined sequence or random. The most advantageous is random or pseudo-random appearance of new created object. Because of the human mind's understanding of patterns it is advantageous to use squares, tetragons, triangles or hexagons as units. The most advantageous of all is the usage of squares, dominoes, triminoes, tetraminoes, pentaminoes, hexaminoes, septaminoes or other -minoes as created objects. Optionally, any other geometrical or non-geometrical object can be predefined, user-defined or user-created. The maximum number of units of created objects is advisable to be equal or less than a minimum side of the playing field size. A created object can be placed within a current playing field and enter other playing fields by moving in (stepping in), projecting in or jumping in. In a computer game, it is possible to use a keyboard as well as a mouse to move a created object. After placing the created object, an allowed time for placing every new object is shorter. A created object can be discarded under predefined or user-defined rule.

A cluster is a part (or whole) of the playing field, which consists of units, grouped according to a predefined or user-defined rule. One cluster can belong to only one playing field, or two or more playing fields can share the same cluster. Clusters are not necessarily of the same size.

A playing field is a two-dimensional or three-dimensional space in which a rule of erasing columns and/or rows is valid. The playing field comprises units grouped in one or more clusters and can vary in size and shape. It is advantageous to use a minimum size side which is equal or bigger than the maximum number of units in the created object. The number of units can vary so that the object can fit within the playing field.

A playing area in an object includes all playing fields. It is possible to extend a playing field to a wider area. The playing fields can be aligned or overlapped in total or in part. A group of joined playing fields, no mater if overlapped or not, creates a wider playing area which is not limited with respect to the number of joined playing fields in any way, and can be a single or several playing fields. It is possible to play within the entire playing area by moving through the playing fields according to the playing rule.

A playing space is a space that contains a playing area (e.g., a computer screen for a two-dimensional game, or a volume that contains three-dimensional containers in the case of a three-dimensional game).

Columns and rows are a predefined or user-defined set of units, which are consecutive orders of units that stretch from one end of the playing field to another, in all directions. The columns and rows may be arranged at an angle of 90 degrees. However, it is contemplated that the columns and rows may be arranged at an angle other than 90 degrees, for example, at 60, 120 degrees or any other angle). Placed objects and/or special units which form columns and/or rows are removable according to the basic rule.

A basic rule is that a player during the game positions and places created objects on allowed positions, according to the playing rule. When sets of units defined as one or more column and/or row are completely filled with one or more parts of previously placed created objects and/or special units, parts of objects and/or special units which are placed within that columns and/or within that rows, are removed from the field. If the created object is placed in more than one playing field simultaneously, then completely filled columns and/or rows in all involved playing fields are removed.

A playing rule is that a created object can be rotated, mirrored and moved. It can be moved within the playing area and placed (if not overlapped) on a current position, projected (optionally) in one of the defined directions or jump (optionally) within the same or to another cluster or playing field. A created object can move to another playing field by moving into, projecting (and positioning) or jumping into another playing field or cluster (with or without positioning).

If the mechanism of positioning the object defines a current position (if not overlapping with previously placed objects), all objects within the columns and/or rows in the current playing field(s) are removed.

If the mechanism of positioning the object defines positioning of a non-overlapping object is a projection inside the playing field, the playing object is projected in a chosen direction until it reaches an already placed or special unit. The projected playing object is placed in the last position where it does not overlap with a previously positioned or special unit. The columns and/or rows are removed according to the rule. Optionally, because of the projecting playing technique, it is possible to shift already placed objects for an erased number of columns and/or rows. An erasure by correctly playing a number of times in one direction leads towards digging into already-placed/unreachable patterns in a played direction and creating more space at the opposite end of the playing field.

If the mechanism of positioning the object defines positioning the object as a jump between the clusters or playing fields, the created object appears in another cluster or playing field. If so defined, it can appear on the same position as it was in the previous cluster or playing field. The increment in movement is not one step but an entire cluster or playing field. This variant is especially efficient for small playing fields. An exemplary use is in hexagon games.

A "game over" occurs when there is no open space to place a created object and there is no possibility to discard it. Further playing is then not possible.

Combined playing fields can be more than two playing fields. A flow of a game will differ within the same playing area according to the choice of playing. Regarding the type of units used, it is possible to create games which use a basic shape of a triangle, tetragon, hexagon or other as a unit.

Unit=Triangle

In the case where the created object is one triangle or a group of triangles it is advantageous to use playing fields that are two joined clusters. Each of the clusters comprises aligned triangles in the form of a big triangle. Two such clusters aligned with respect to their sides form a playing field, which is a tetragon with four same-size sides or other suitable sides and angles. A cluster can form one playing field or be shared between two or three playing fields. Concatenating of the playing fields through a cluster alignment and shared clusters allows the creation of bigger playing areas. The size of a cluster is not limited in any way, neither in size, nor in numbers of units. Where the playing area is formed by units which are triangles of the same size and shape, there are no areas which are unreachable, except units defined as such (if any). Groups of $n^2$ of such units form clusters with a side having the size of n units. The most convenient column or row in this case is defined as 2 n units aligned by sides and forming a tetragon with sides of sizes one and n units, which stretch within sides of the playing field (two clusters). The columns and/or rows can stretch in any of three possible directions. If the columns and/or rows are defined as n units, the columns and rows extend along the sides of the playing field and they are aligned, e.g., with points. It is advisable to use created objects as a group of maximum 2 n units in case of a mandatory alignment of the sides between them, or a group of maximum n units in case of a mandatory alignment of the sides or points between them. Note that the alignment rule for a created object is not associated with the alignment definition of columns and/or rows.

Unit=Tetragon

Where the created object is a tetragon, or a group of tetragons, it is advantageous to use playing fields that are bigger tetragons and that have sides with minimum lengths that are equal to a maximum number of units of the created object. The maximum length of a side is not limited. It may not be advantageous to use a too disproportional length for a side because columns or rows may be removed depending on which one is shorter. Clusters can differ in size and, especially where the clusters belong to only one playing field, may have a side length which is less than the maximum number of units in the created object. Using square units is advantageous because square units can be combined as polymino created objects (unimino, domino, trimino, tetramino, pentamino, hexamino, septamino, octamino and the like).

If the playing field is a tetragon, it can be constructed to have a constant size or as having variable sizes. It is advantageous to use a playing field with a minimum side length that is equal to a maximum number of squares of the created object (polymino) that appears during the game. For example, where the created objects are pentaminos the minimum length of a side of a playing field is five units. In case the created objects are tetraminos the minimum length of a side of a playing field is four units. It is optional to have predefined and/or user-defined special units. The special units may have one of the following characteristics: sociable, unsociable, reachable, nonreachable, erasable or nonerasable.

If the playing area consists of more playing fields, the playing fields may be aligned, not aligned or overlapped, partially or totally. If the playing fields are aligned, the basic rule is applicable to each playing field independently. If the playing field is overlapped, partially or totally, the basic rule in the overlapped parts is applicable to each of the playing fields that are overlapping as if it were not overlapping.

If there are tetragon shaped playing fields that are not aligned, or aligned only by points, then the columns and/or rows in each of the playing fields are removed independently according to the basic rule. The created objects can move within one playing field and jump (optionally) from one playing field to another. They may be placed in each of the playing fields causing execution of the basic rule in the playing fields independently with respect to the placed parts of the placed and created object in each column and/or row.

If there are tetragon-shaped playing fields that are aligned with respect to their sides, in part or in whole, the columns and/or rows in each of the playing fields are removed independently according to the basic rule. The created objects can move, be projected or jump from one playing field to another. They can be placed partly in each of the playing fields causing execution of the basic rule in the playing fields independently with respect to the placed parts of the placed created object in each of them.

For example, there are three, non-overlapped, square-shaped playing fields that are aligned in the form of triminoes. In each square of the playing fields, the basic rule of removing full columns and/or rows will be valid regardless of other squares in the playing fields.

If there are tetragon-shaped playing fields that are overlapped, the basic rule of both playing fields is applied in parts where they overlap. In case there is only one playing field, only the playing rule of that playing field is applicable. The columns or rows that are shared with other playing fields are removable from the non-overlapped part only together with the columns or rows in the overlapped area.

For example, there are tetragon-shaped playing fields in which domino-shaped playing fields each overlap by one half. In parts where they overlap the basic rule of both playing fields is applied. In non-overlapping half columns or rows that are also partly in overlapped areas, the columns or rows are removable only if they are full.

For example, two domino-shaped playing fields overlap in such way that a lower half of a vertical playing field overlaps with a left half of a horizontal playing field. In an overlapped area, both columns (because of the columns in the horizontal playing field) and rows (because of the rows in the vertical playing field) of the overlapped area will be removable. In an upper half of the vertical playing field, the rows will be removed when the rows are full in this part only. The columns will be removed from an upper half of the vertical playing field only if columns are full, both in the upper and lower half at the same time (whole vertical playing field high). In the right half of the horizontal playing field, the columns will be removed when they are full in this part only. The rows will be removed from the right half of the horizontal playing field only when they are full, in both the right and left half at the same time (whole horizontal playing field length).

For example, there are two horizontal domino-shaped playing fields in which a right half of a left playing field overlaps with a left half of the right playing field. In the overlapped area, the columns are removed when they are full, and the rows are removed only as part of the left (or right) playing fields' rows. In the right half of the right playing field, the columns will be removed when they are full in this right half only. The rows will be removed from this right half only when they are full in both the right half and left half at the same time (the whole of the right playing field length). In the left half of the left playing field, the columns will be removed when they are full in this left half only. The rows will be removed from this left half only when they are full in both the left half and the right half at the same time (the whole of left playing field length).

A combination of two half overlapped domino playing fields results in trimino shaped playing areas. By combining domino shaped playing fields in such a manner, other different polymino-shaped playing areas (like tetraminoes, pentaminoes hexaminoes, septaminoes, octaminoes, nonaminoes, decaminoes, dodecaminoes icosiminoes etc.) can be formed.

For example, there are two, horizontal, domino-shaped playing fields which are aligned by their longer sides and which form a square tetramino-shaped playing area. Simultaneously, there are two vertical domino-shaped playing fields which are aligned by their longer sides and which create the same square playing area. If the square playing areas overlap with two horizontal domino-shaped playing areas, in each half of each of the domino-shaped playing fields all columns and/or rows will be removable. It is the same result as having four square-shaped playing fields (sized as one half of domino-shaped playing field) aligned together in a big square tetramino-shaped playing area. In other words, in both cases, the playing area will be the same, and the game will be the same no mater which combination of the playing fields and playing rule is chosen. To the contrary, if there are only two domino-shaped playing fields, it would be advantageous for the flow of the game to define if they are horizontal or vertical domino-shaped playing fields, and which playing rule is valid.

For example, four domino-shaped playing fields are overlapping by one half and form a cross-like pentamino-shaped playing area. In the overlapped area, the columns and/or rows of this area only are removable. In the left and right cross points, the columns are removable in each point, but the rows are removable only together with rows in the overlapped area, because then they form full rows of the playing fields. In upper and lower cross points, the rows are removable in each point, but the columns are removable only together with the columns in the overlapped area, because then they form full columns of the playing fields. In case the same cross-like, pentamino-shaped playing area is formed by five, square-shaped playing fields (sized as one half of domino-shaped playing field) which are aligned together, the columns and/or rows will be removable in each of the five, square-shaped playing fields.

For example, a cross-like, pentamino-shaped playing area is formed by three domino-shaped playing fields that each overlap in one half as in a previous example and one square playing field which is sized half of a domino-shaped playing field acting as a fourth cross point. The columns and/or rows are removable in that square-shaped playing field alone, and in the other three points removing occurs as described above.

For example, combined tetragon-shaped playing fields are not domino-shaped playing fields. If a ratio of the sizes differs about 2:1, the number of playing areas is far greater.

For example, there are not only halves of playing field which are overlapping, but also non-half overlapping and aligned tetragon-shaped playing fields. If the playing fields do not overlap exactly one half of a domino-shaped playing field, the possible number of playing areas is greater.

It is contemplated that combined playing fields can have different sizes. For example, a smaller playing field exists inside a bigger playing field. Within the smaller playing field, the basic rule for both playing fields is applicable, and to the rest of the playing area, only the basic rule for the bigger playing field is applicable.

Unit=Hexagon

In case the created object is one hexagon or group of hexagons, it is advantageous to use playing fields that include at least two joined clusters of seven aligned hexagons. Each of those clusters is formed by six hexagons which are aligned by a side to a middle hexagon ("rose"). Every non-middle cluster is aligned to two other non-middle clusters, which are not aligned in between.

If the playing fields are formed by two clusters joined by one side, a maximum number of four units of created objects may be used. In this case, a column/row is formed by four or five hexagons aligned with opposite sides to each other and forming an arrangement that extends from one end of the playing field to another in one of three directions.

For example, if the playing fields are formed by two non-middle clusters joined to each other by opposite sides of the middle one, a maximum number of seven units of created objects may be used. In this case, the column/row is formed by concatenating seven hexagons aligned through opposite sides to each other and forming an arrangement that extends from one end of the playing field to another in one of three directions.

For example, in a game where the created object includes between one and seven hexagons within the 'rose' cluster, the playing area is defined as at least two 'rose' clusters. The created object can be rotated, mirrored and placed within the current cluster, step into or jump between 'rose' clusters. It is advantageous to use a mouse to perform these manipulations of the created object.

For example, in a game where the created object includes between one and seven hexagons concatenated by at least one side, the playing field is defined as at least three clusters in order. The playing field is of the order of three clusters, and the columns/rows are defined as seven hexagons forming an arrangement that extends from one end of the playing field to another in one of three directions.

In one embodiment, the minimum playing area includes seven clusters joined in a 'big rose' based on the same principle as seven units joined in a 'rose'. The playing area can be enlarged by following the same fractal structure. The columns and/or rows are diagonals of a 'big rose', each consisting of seven units, and including a total of five columns/rows in each of three possible directions. The created object has a size of between one and seven units. In one embodiment, the created object includes four or five joined units. A different situation exists when the created object does not extend the size of a 'rose'.

For example, in the same playing area, the columns and/or rows can be defined as three units in order (diagonals of the 'rose'). If the playing rule requires that all three possibilities within the 'rose' need to be filled at the same time (the columns and rows, not columns or rows), this means that the whole 'rose' has to be filled before it can be emptied.

Multiplayer Games

It is contemplated that the games described above may be designed as multiplayer games. It may be a peaceful combination that allows parallel playing (possibly on the same playing space), or a combat variant. In a combat variant, the opponents can send blocking patterns of units to each other. The blocking patterns can have the characteristic of being reachable or unreachable, removable or nonremovable. The blocking patterns can be sent into one or more clusters or playing fields in the opponent's playing area. When a player succeeds in cleaning all special and blocking units, this is a triggering event that sends a blocking pattern to the opponent. The players of the multiparty game, depending on the number of players, can be grouped in one or more opponent groups, with one or more members in each group. In the multiparty game the created objects and the decision whom and where a blocking pattern will be sent is (pseudo) random, predefined or user-defined.

FIG. 7 illustrates a computer system 300 suitable for playing the game according to the invention. The computer system 300 includes a computer 306 having a monitor 304, a keyboard 308 and a mouse 310. To allow the user to hear sound effects the computer system 300 includes a pair of speakers 302 connected to the computer 306.

The computer 306 may be a Commodore Amiga 500+ with or without a PC simulator, a PC AT (IBM 80286), a PC AT 386, an Apricot PC AT 486 DX2 (66 MHz), an Acer Notebook with Pentium 120 MHz and a PC AT with Pentium 200 MHz. These computers are examples of computers that are suitable to run the game.

The game may be programmed for the Commodore Amiga 500+ in assembly language, and for personal computers (PC) in MS-DOS command language and Visual Basic for Windows 95/98. The objects and units are first programmed as clusters of characters. A beeper may be incorporated, for example, in a PC produced sound. The game may be programmed in Borland's Turbo Pascal and Borland's Turbo Assembler. Revisions, versions, expansions of the program may be reprogrammed for MS-DOS 16 colors graphics in Borland's 'Turbo Assembler and Borland's' Turbo Pascal, and in Borland's Pascal 7.0.

Advanced versions of the program for the game in accordance with the invention are programmed in at least 256 colors and for Windows 95/98. Programming may be performed using Inprise's Delphi (current version is 4.0), MS-Windows 95/98 in C++ with computer algorithms known to those skilled in the art. Some versions have at least 256 colors, Hi-Fi sound and are available as a set of CD-ROMs.

Further, it is possible to program the game according to the invention for Macintosh and consoles (i.e., Playstation, Dreamcast, Gameboy, Pokemon) with computer algorithms known to those skilled in the art.

What is claimed is:

1. A computerized procedure of aligning objects in a field, the procedure comprising:

creating a new object of one of a plurality of shapes within a field;

placing the new object within the field;

moving the new object within the field to a first place, wherein the moving of the object occurs regardless if the object is situated above one or more other objects;

detecting whether the new object is placed to at least partially overlap with one or more other objects;

detecting whether at least one continuous alignment within the field is filled with one or more parts of the objects; and removing the objects or parts within a filled continuous alignment from the field if no object is positioned above any other object and at least one complete continuous alignment is filled with the objects or parts of the objects.

2. The procedure according to claim 1, wherein the objects have the same shape.

3. A computerized procedure of aligning objects in a field, the procedure comprising:

creating a new two dimensional or three dimensional object;

moving the new object within the field, wherein the moving of the object occurs without directional constraint and regardless of whether the object is overlapping with one or more other objects;

positioning the new object within the field;

detecting whether the new object is overlapping with one or more other objects;

detecting whether at least one column or at least one row within the field is filled with one or more parts of the objects;

removing the objects or parts within a filled column and/or filled row from the field if no object is overlapping with any other object and at least one complete row or column is filled with the objects or parts of the objects and the remaining objects in the field do not shift.

4. The computerized procedure according to claim 3, wherein the columns and the rows are arranged at at least one acute angle.

5. The computerized procedure according to claim 3, further comprising using the positioning and moving of the new object to teach logic and pattern recognition.

6. The computerized procedure according to claim 3, wherein the object is a polyhedron.

7. The computerized procedure according to claim 3, wherein two or more players grouped in one or more opponent groups, with one or more members in each group, are playing peaceful and/or combat variant and are sending blocking patterns of units within two dimensional and/or three dimensional playing space.

8. The computerized procedure according to claim 3, wherein the objects are formed by joined triangles, tetragons, circles, ellipses, pentagons or hexagons.

9. The computerized procedure according to claim 3, wherein a non-overlapped object is projected inside the playing field in a direction chosen by player, until said object reaches an already placed or special unit and the columns and/or rows are removed according to the playing rule.

10. The computerized procedure according to claim 9, wherein said object is positioned on the side of the playing field opposite than said played direction, referring from erased columns and/or rows, shift in the played direction for erased number of columns and/or rows.

11. The computerized procedure according to claim 3, wherein the computer system is a console.

12. The computerized procedure of claim 1, wherein the columns and rows are units in order that stretch from one end of a cluster to another, in all directions.

13. The computerized procedure of claim 12, wherein the cluster has to be filled before it can be emptied.

14. The computerized procedure of claim 1, wherein the already placed objects shift for an erased number of columns and/or rows, in a case of projecting playing technique.

* * * * *